US008033715B2

(12) United States Patent
Pérez-Luna et al.

(10) Patent No.: US 8,033,715 B2
(45) Date of Patent: Oct. 11, 2011

(54) NANOPARTICLE BASED THERMAL HISTORY INDICATORS

(75) Inventors: Victor Hugo Pérez-Luna, Naperville, IL (US); Pravin Ajitkumar Betala, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 11/983,367

(22) Filed: Nov. 8, 2007

(65) Prior Publication Data

US 2009/0122829 A1    May 14, 2009

(51) Int. Cl.
*G01K 11/00* (2006.01)
*G01K 3/00* (2006.01)
(52) U.S. Cl. ......... 374/102; 374/106; 374/162; 116/216
(58) Field of Classification Search .................. 374/102, 374/106, 162; 116/216
See application file for complete search history.

(56) References Cited

U.S. PATENT DOCUMENTS

| | | | |
|---|---|---|---|
| 6,048,616 A * | 4/2000 | Gallagher et al. | 428/407 |
| 6,514,767 B1 | 2/2003 | Natan | |
| 6,565,973 B2 * | 5/2003 | Duff et al. | 428/402 |
| 6,750,016 B2 | 6/2004 | Mirkin et al. | |
| 6,756,120 B2 * | 6/2004 | Smith et al. | 428/404 |
| 6,846,565 B2 * | 1/2005 | Korgel et al. | 428/402 |
| 6,888,665 B2 | 5/2005 | Feldheim et al. | |
| 6,982,117 B2 * | 1/2006 | Smith et al. | 428/323 |
| 7,033,415 B2 | 4/2006 | Mirkin et al. | |
| 7,078,276 B1 | 7/2006 | Zurcher et al. | |
| 7,192,778 B2 | 3/2007 | Natan | |
| 7,198,771 B2 | 4/2007 | Keller et al. | |
| 7,465,693 B2 * | 12/2008 | Greer et al. | 503/200 |
| 2003/0224168 A1 | 12/2003 | Mack et al. | |
| 2004/0247503 A1 | 12/2004 | Hyeon | |
| 2005/0255629 A1 | 11/2005 | Han et al. | |
| 2006/0083694 A1 * | 4/2006 | Kodas et al. | 424/46 |
| 2006/0189113 A1 | 8/2006 | Vanheusden et al. | |
| 2006/0196309 A1 | 9/2006 | Niidome et al. | |
| 2006/0222592 A1 | 10/2006 | Burda | |
| 2006/0249384 A1 | 11/2006 | Kim et al. | |
| 2006/0286684 A1 * | 12/2006 | Brennan et al. | 436/525 |
| 2006/0293171 A1 | 12/2006 | Santaren Rome et al. | |
| 2007/0034833 A1 * | 2/2007 | Parce et al. | 252/301.36 |
| 2007/0051815 A1 | 3/2007 | Sailor et al. | |
| 2007/0077429 A1 | 4/2007 | Mirkin et al. | |
| 2007/0080345 A1 | 4/2007 | Joo et al. | |
| 2007/0158624 A1 * | 7/2007 | Weder et al. | 252/582 |
| 2007/0189359 A1 * | 8/2007 | Chen et al. | 374/161 |
| 2007/0207335 A1 * | 9/2007 | Karandikar et al. | 428/560 |
| 2008/0006121 A1 * | 1/2008 | Keller et al. | 75/255 |
| 2008/0025154 A1 * | 1/2008 | MacDonald et al. | 368/89 |
| 2009/0161727 A1 * | 6/2009 | Wielgus et al. | 374/185 |
| 2009/0304905 A1 * | 12/2009 | Graham et al. | 427/8 |

(Continued)

FOREIGN PATENT DOCUMENTS

EP    1 579 935    9/2005

*Primary Examiner* — Lisa Caputo
*Assistant Examiner* — Mirellys Jagan
(74) *Attorney, Agent, or Firm* — Pauley Petersen & Erickson

(57) ABSTRACT

An indicator composition for determining a thermal or chronological history during shipping or storage of a product. The composition includes a plurality of nanoparticles dispersed throughout a matrix. The nanoparticles turn color while dispersed in the matrix as a function at least one of time and temperature.

21 Claims, 7 Drawing Sheets

U.S. PATENT DOCUMENTS

2009/0326614 A1* 12/2009 El-Sayed et al. .............. 607/88
2010/0012018 A1* 1/2010 Ribi .............................. 116/207
2010/0020846 A1* 1/2010 Kagan et al. ................. 374/141
2010/0028983 A1* 2/2010 Geddes ...................... 435/287.2
2010/0059726 A1* 3/2010 Jung et al. ..................... 252/582
2010/0068817 A1* 3/2010 Mirkin et al. ................... 436/80

* cited by examiner

NANOPARTICLE BASED THERMAL HISTORY INDICATORS

GOVERNMENT INTEREST

This work was supported in part by award number N00014-05-1-0914 from the Office of Naval Research. The U.S. Government has certain rights to this invention.

FIELD OF THE INVENTION

This invention relates generally to indicators for temperature and time and, more particularly, to a thermal or chronological indicator for use in determining temperature or time for storing and/or shipping products.

SUMMARY OF THE INVENTION

A general object of the invention is to provide an improved thermal or chronological indicator, particularly for use during product shipment and/or storage.

The general object of the invention can be attained, at least in part, through a combination including a plurality of nanoparticles and a matrix. The plurality of nanoparticles is dispersed throughout the matrix to form a thermal or chronological indicator in which the nanoparticles turn color while dispersed in the matrix as a function at least one of time and temperature.

The invention further comprehends a method of determining at least one of a thermal or chronological history during shipping or storage of a product. The method includes placing an indicator with the product. The indicator is at least one of a thermal indicator and a chronological indicator, and the indicator includes a plurality of nanoparticles dispersed throughout a matrix, where the nanoparticles turn color while dispersed in the matrix as a function at least one of temperature and time. The method further includes at least one of storing and shipping the product with the indicator and evaluating the indicator after the at least one of storing and shipping the product with the indicator.

The indicator compositions of one embodiment of this invention use the synthesis of nanoparticles such as nanorods that have morphology and optical properties that vary with temperature and/or time. The indicator compositions take advantage of the inherent instability of metallic nanoparticles with time and temperature for use as thermal history indicators for a variety of applications. The indicator compositions of this invention have tremendous potential to indicate the thermal history of a product by displaying the change in color as an effect of temperature over a period of time.

Exemplary applications where the thermal history indicators of this invention would be useful include: perishable food products; time and temperature sensitive pharmaceuticals; monitoring the storage conditions of products such as sensitive chemicals, vaccines, food, and pharmaceuticals, during transport from production to distribution to consumer; storage conditions of temperature sensitive electronic components; and other applications where it is necessary to have a reliable indication of exposure to detrimental temperature conditions for a sensitive product. The indicators of this invention can greatly help assess liabilities when a temperature sensitive product has not been handled under proper storage conditions at any point from production to distribution. The indicators are generally easy to evaluate as they are based on color, their production is relatively inexpensive, and the conditions under which they display thermal history effects can be adjusted to varying degrees of sensitivity (e.g., these indicators can be made to indicate changes in temperature over a few minutes, a few days or even weeks and months according to particular needs).

Other objects and advantages will be apparent to those skilled in the art from the following detailed description taken in conjunction with the figures and the appended claims.

DETAILED DESCRIPTION OF THE INVENTION

Figure 1:
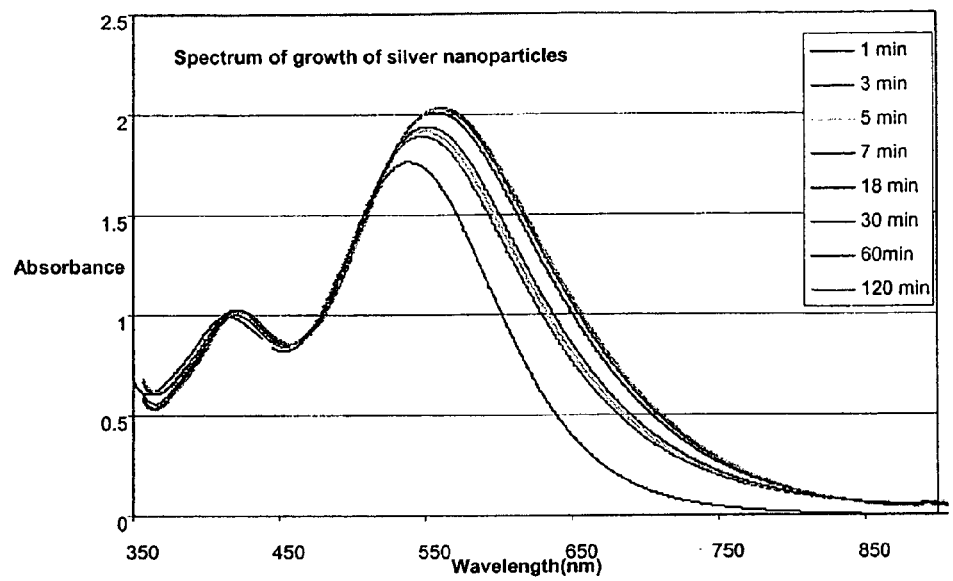
FIGS. 1-13 include optical absorption spectral measurements for samples of the particular Examples below.

The present invention comprises the preparation of compositions including anisometric metal nanoparticles (e.g., nanorods) and stabilizing surfactants that exhibit varying optical properties as a function of temperature and/or time. The thermal indicator of this invention changes color in response to increases in temperature with time, and, in one embodiment of this invention, may be used for indicating the time-based thermal history of temperature sensitive products, for both short time and long time history. The compositions of this invention can be tailored for varying temperature ranges, times of thermal exposure, or both. The different combinations of reactants according to this invention to produce different sized nanoparticles with varying thermal stability can be used to develop products for a range of thermal indicators.

In one embodiment of this invention, the indicator composition includes a plurality of nanoparticles dispersed throughout a matrix. Nanoparticles for use in this invention desirably have an anisometric shape. In one embodiment of the invention, the nanoparticles are nanorods, but the nanoparticles can also be nanoplates, nanotriangles, nanoprisms, nanowires, and multipods. Exemplary nanoparticles include metal nanoparticles that exhibit plasmon resonance in the visible region of the electromagnetic spectrum, such as silver nanoparticles, gold nanoparticles, platinum nanoparticles, copper nanoparticles, and combinations thereof. The nanoparticles, and solutions thereof, can be formed according to various and alternative processes (including known processes), such as by using a seed solution as discussed below in the Examples.

The nanoparticles are dispersed throughout the matrix to form a thermal or chronological indicator in which the nanoparticles turn color while dispersed in the matrix as a function at least one of time and temperature. Any matrix material that keeps the nanoparticles in dispersion, and limits particle contact and aggregation, is suitable as the matrix of this invention. In one preferred embodiment, the matrix comprises a solution. The solution desirably includes a stabilizing surfactant which affects the color change characteristics of the indicator. In other words, the rate at which the nanoparticles turn color while dispersed in the matrix is a function of, e.g., dependent upon, an amount and/or type of the stabilizing surfactant. Nanorods, for example, will naturally change shape over time, and as this shape change causes the color change used by this invention as a thermal history indicator, the stabilizing surfactant is used to limit aggregation and control, e.g., slow, the normal or natural progression of the shape changes. Stabilizing surfactants according to this invention can include cationic, anionic, and/or non-ionic surfactants. Exemplary stabilizing surfactants include cetyltrimethyl ammonium bromide, tetraoctyl ammonium bromide, alkanethiols, and combinations thereof.

In another embodiment of this invention, the matrix is a solid material matrix, such as a polymer material. Various and alternative polymers could be used to, for example, form a polymer film indicator with the nanoparticles dispersed on or in the film, either throughout or in select areas of the film. As will be appreciated, the polymer film could be applied to a product, or a bulk package of individual products, as a temperature indicator label. A color change in the appropriate portion of the polymer film would be used to indicate the thermal history of the package.

The invention thus includes a method of determining at least one of a thermal or chronological history during shipping or storage of a product. An indicator is placed with the product to be shipped or stored. The indicator can be any indicator of this invention, and is a thermal indicator and/or a chronological indicator including a plurality of nanoparticles dispersed throughout a matrix. As discussed above, the nanoparticles are able to, and will, turn color while dispersed in the matrix when exposed to increased temperature and/or over extended periods of time. The product is stored and/or shipped with the indicator in close proximity, such as on the product itself, or on or within a storing/shipping container holding the product. When the product is brought out of storage or reaches is destination, the indicator is evaluated to determine the thermal and/or chronological history, e.g., whether the product experienced too high of temperatures or too long of storage for that particular product.

The indicators of this invention have applications in research and industry, as indicators of thermal history and kinetic or time-based history. As the optical properties of these metallic nanoparticles are dependent on their morphology and the aspect ratio, and their morphology varies with temperature and time, the change in the optical properties takes place with increase of temperature, as visually evident from the change in color. Extremely precise changes in optical properties can be measured by the absorbance spectra in the visible range using a spectrophotometer, but the changes can be visually evident as well.

As an example of a commercial application of this invention, the indicator could form part of the label for perishable food products, such as dairy and meat. The color change of the label can be used to indicate whether the food product was refrigerated properly all the time or was left at higher temperature for a longer period of time. This in turn can indicate the condition of milk before use, if it is still in good condition, because the product can be unsuitable for consumption before the expiration date if it is not stored properly. The indicator of this invention will serve as a guarantee of the product condition, both for customers and retailers. Other uses are to determine if vaccines shipped to remote locations have been maintained under proper storage conditions, or to assure if temperature sensitive chemicals and biochemicals were stored and handled properly during shipping. As will be appreciated by those skilled in the art following the teachings herein provided, the indicators of this invention can be used in numerous applications where thermal history is crucial for the quality of a product, including, but not limited to, perishable food, chemicals or pharmaceutical products, and electronic components (e.g., where high temperatures can damage circuits or erase magnetic storage media).

The indicators of this invention are relatively inexpensive, particularly as the amount of material needed to create an indicator would be very small, and suitable reagents are very economic and readily available. Also, regulatory concerns should not be a concern, as suitable materials for creating the indicators are generally considered harmless.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

To demonstrate aspects of the invention, a nanoparticles solution was prepared as follows:

Preparation of Seed Solution: A 10 ml solution with a final concentration of 0.25 mM silver nitrate and 0.25 mM trisodium citrate was prepared in water. The solution was heated to 50° C. While vigorously stirring the heated solution, 0.3 mL of freshly prepared 10 mM sodium borohydride in water was added all at once. The solution turned yellow. The stirring was continued for 2 hours and then the seed was used.

Preparation of silver nanorods: A different set of solutions, with concentration and volumes as listed below, containing silver nitrate, cetyltrimethyl ammonium bromide (CTAB), and the seed solution were made in water. The solution was mixed carefully and left undisturbed at this point. After 10 minutes, 0.2 mL of 100 mM ascorbic acid and 40 L of 1 M NaOH were simultaneously added with minimal disturbance. Within 1-10 minutes, the color of the solution changed from colorless to pale pink and then to greenish grey. The solution was allowed to stand for 2 hours for the rods to grow. Absorbance measurements are done at each step of the above reaction procedure using optical absorption spectroscopy, highlighting the growth of nanorods, which is shown in FIG. 1. The following series of experiments were performed with varying parameters such as concentration of seed, surfactant, salt, and temperature over a period of time. For each of Examples I-V below, the ratio of volume of solutions in final volume was, for a final volume of 4.36 mL: 4 mL CTAB solution+100 μL silver nitrate+200 μL Ascorbic acid+40 μL NaOH+20 μL Seed solution.

Example I

Varying CTAB Concentration

1) CTAB concentrations: 1 mM, 5 mM, 10 mM, 20 mM, 40 mM, 80 mM

2) Silver nitrate: 10 mM, 125 μL

3) Silver seed: 20 μL

4) Ascorbic acid: 100 mM

5) NaOH: 40 μL

Figure 2:
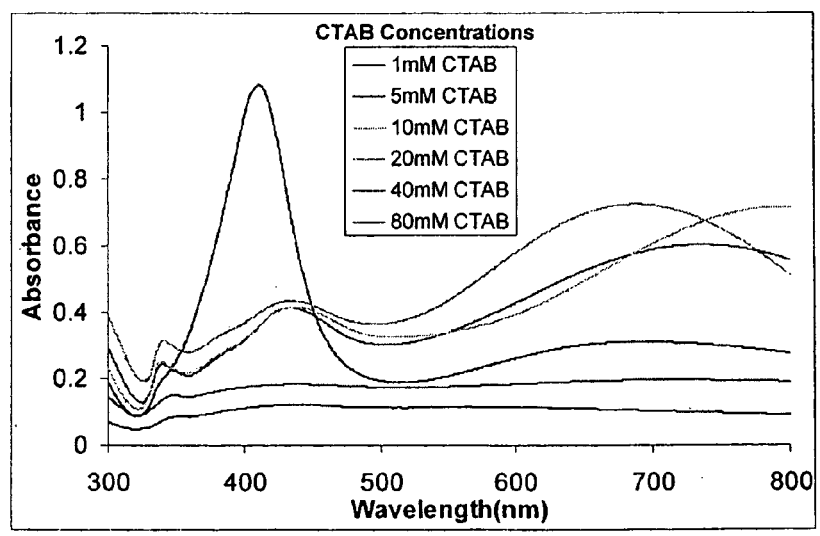

Addition of the ascorbic acid-NaOH produced change in color in all solutions. The CTAB solutions produced pale pink color initially and gradually changed to a different color: 80 mM-Pale greenish; 40 mM-pale yellowish; 20 mM-greenish blue; 10 mM-dark green; 5 mM-bluish green; and 1 mM-parrot green. The optical absorption spectra of these CTAB solutions are shown in FIG. 2.

Example II

Varying Silver Nitrate Concentration

1) CTAB concentration: 20 mM

2) Silver nitrate: 200 μL, 100 μL, 50 μL, 25 μl

3) Silver seed: 20 μL

4) Ascorbic acid: 100 mM

5) NaOH: 40 μL

Figure 3:
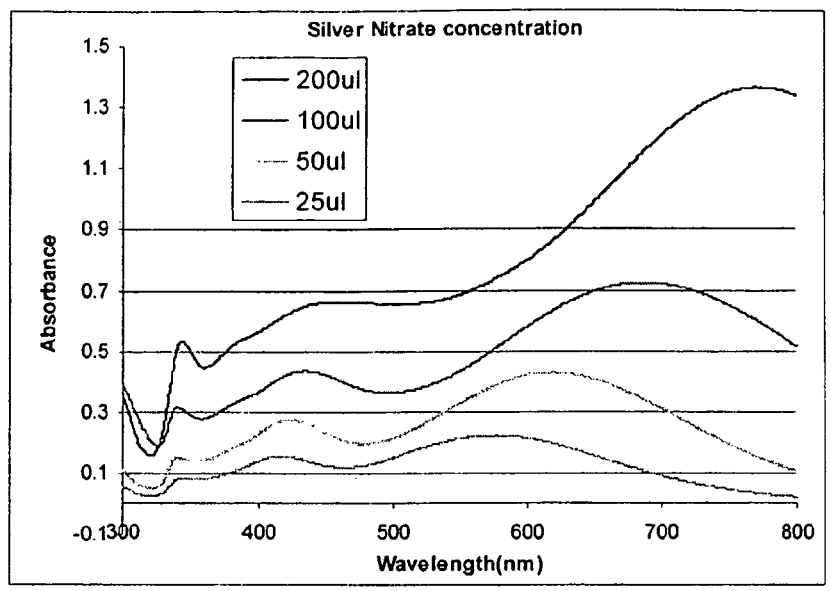

The optical absorption spectra of these solutions are shown in FIG. 3.

Example III

Varying Seed Concentration

Figure 4:
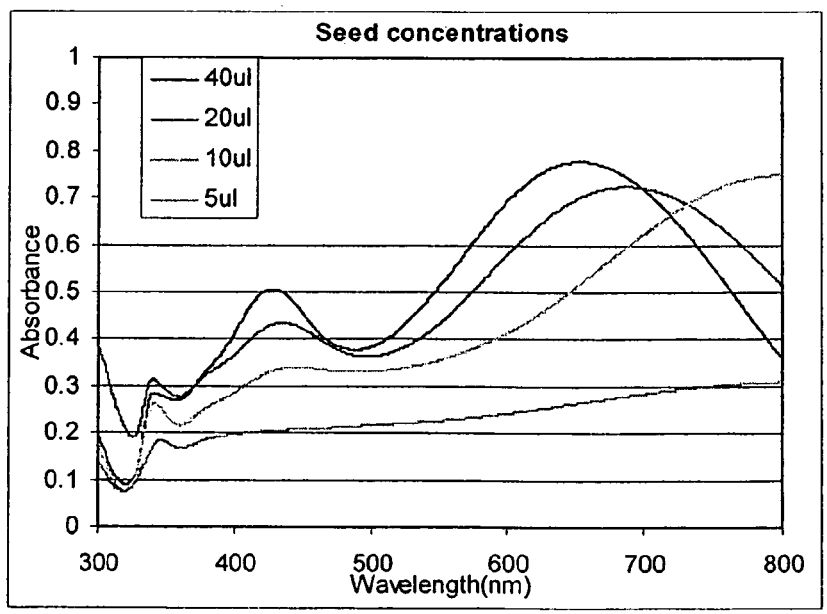

1) CTAB concentration: 20 mM
2) Silver nitrate: 100 µL
3) Silver seed: 40 µL, 20 µL, 10 µL, 5 µL
4) Ascorbic acid: 100 mM
5) NaOH: 40 µL The optical absorption spectra of these solutions are shown in FIG. 4.

Example IV

Temperature Experiment: 20 mM CTAB, 10 µL Silver Nitrate and 20 µL Seed

Figure 5:
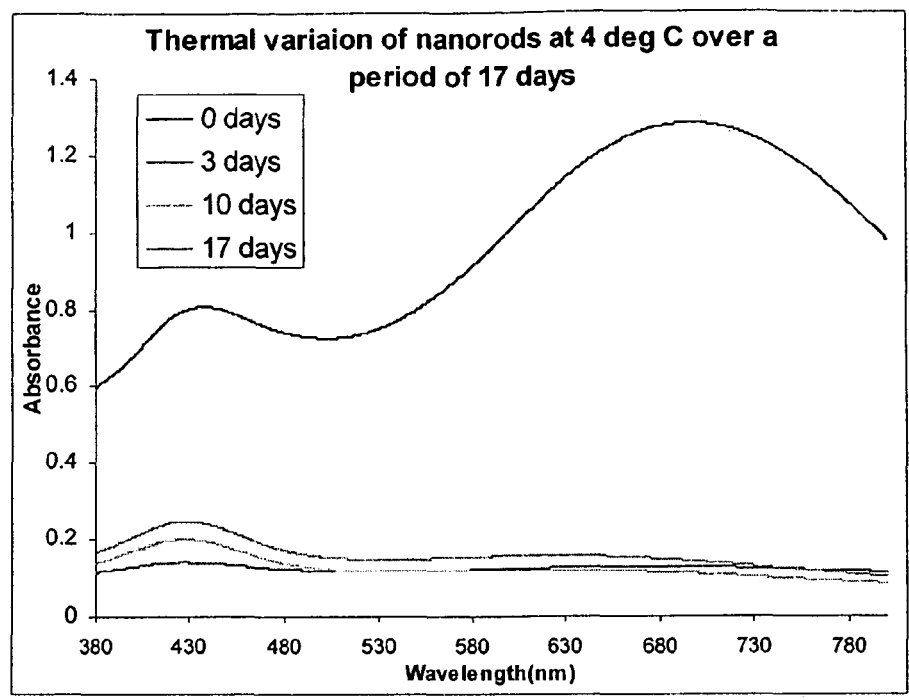
Figure 6:
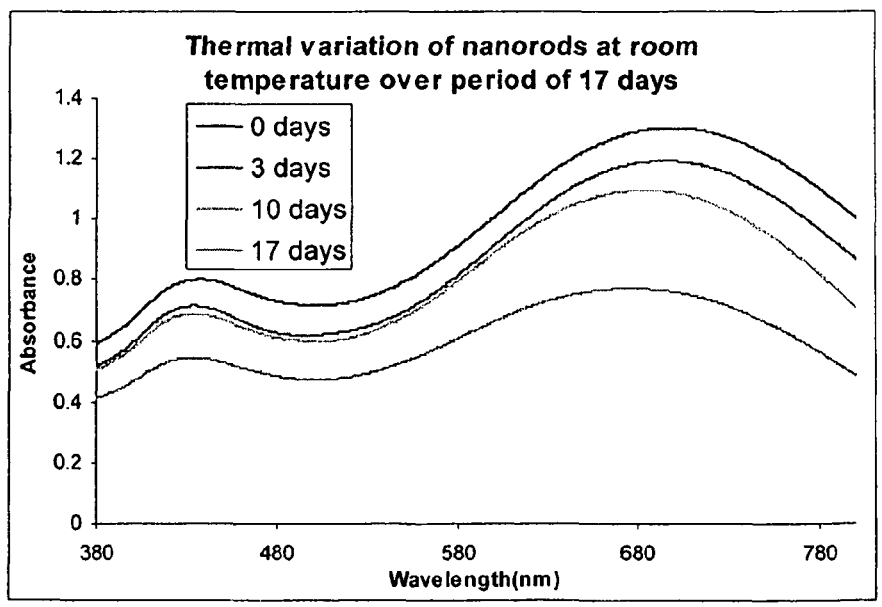
Figure 7:
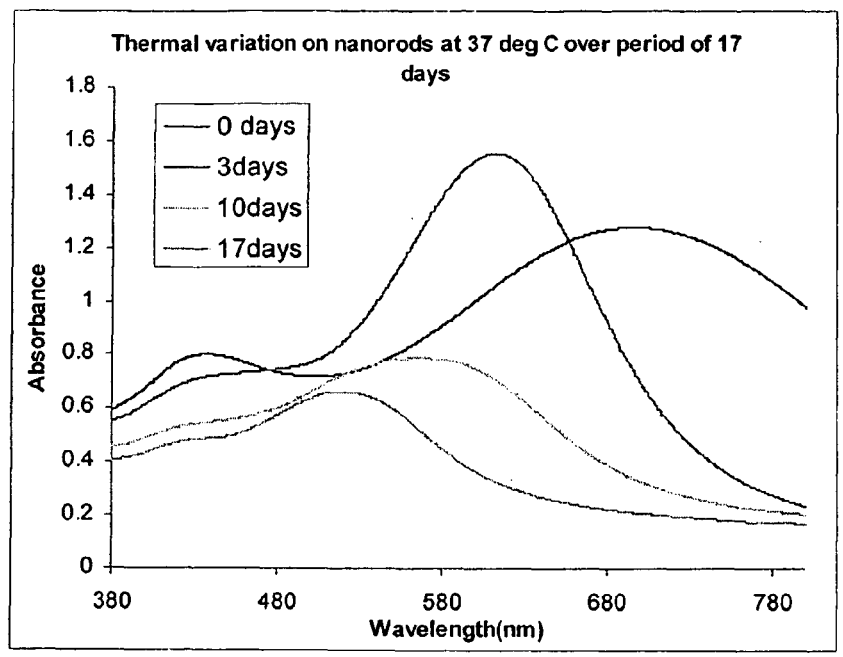
Figure 8:
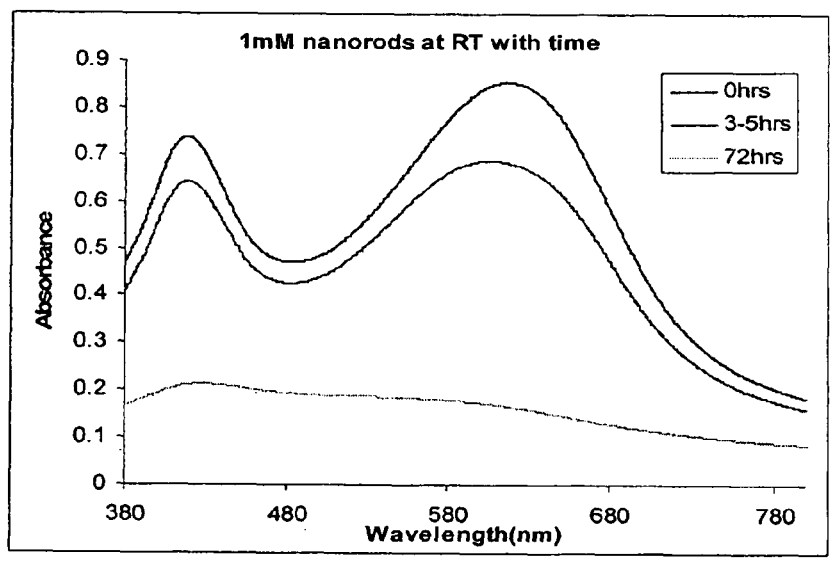
Figure 9:
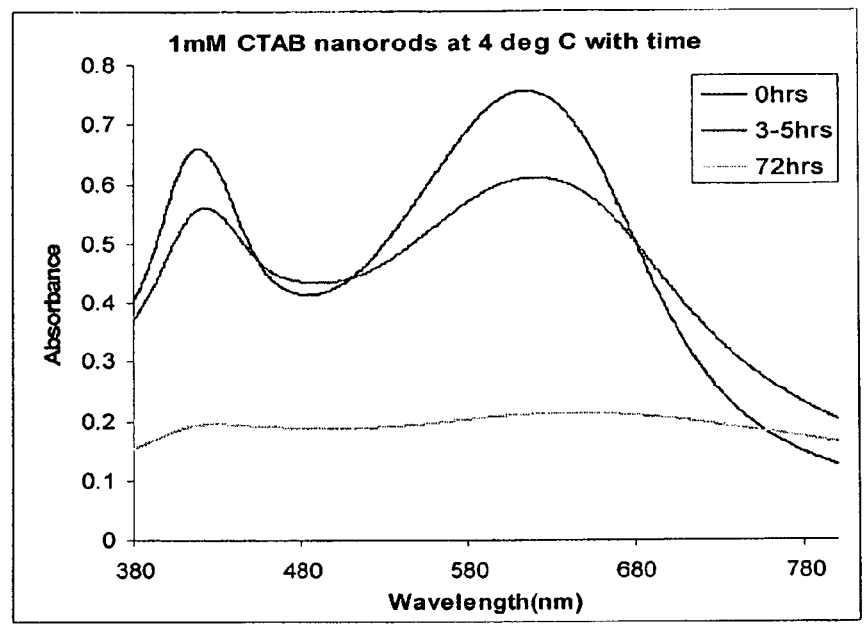
Figure 10:
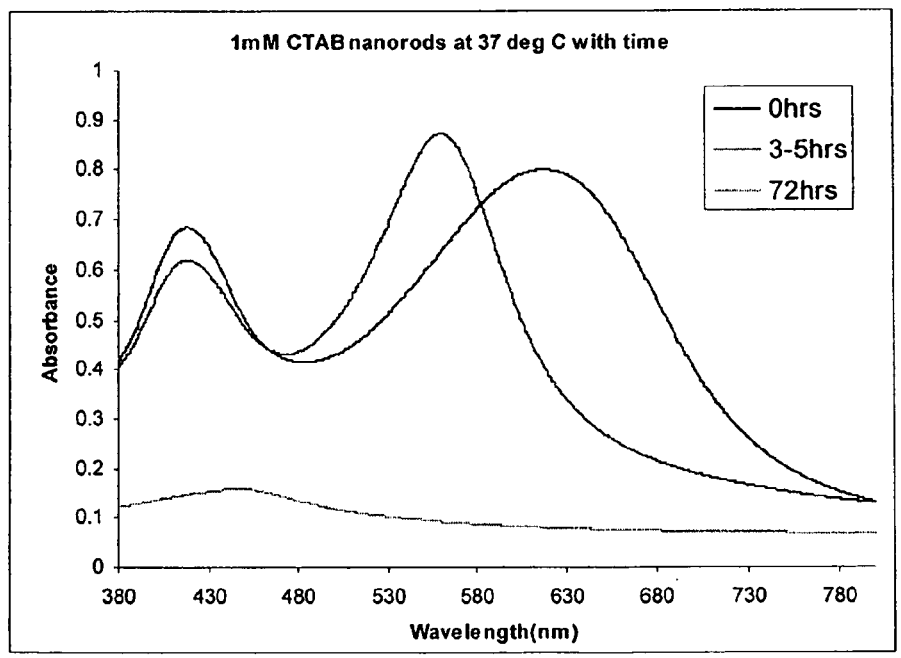
Figure 11:
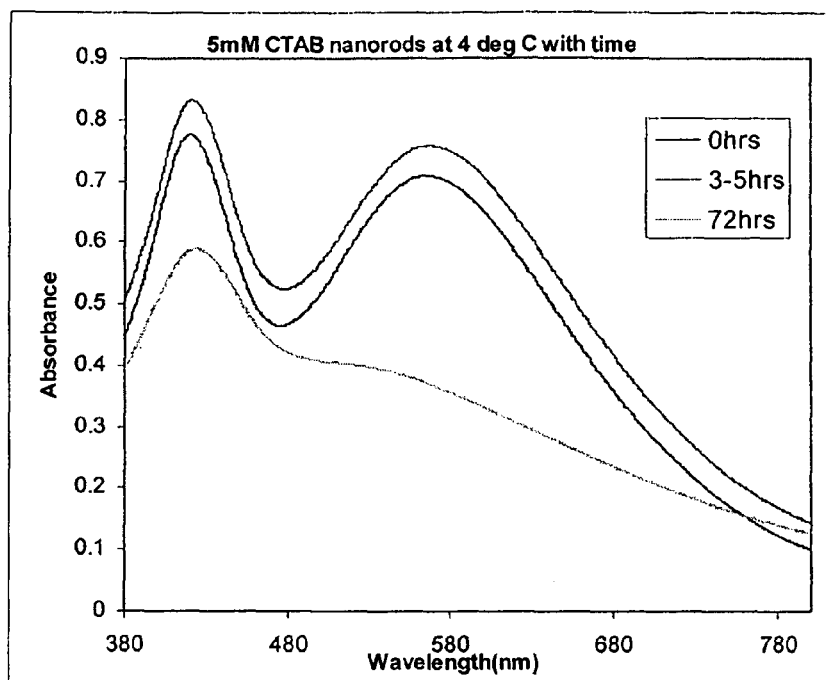
Figure 12:
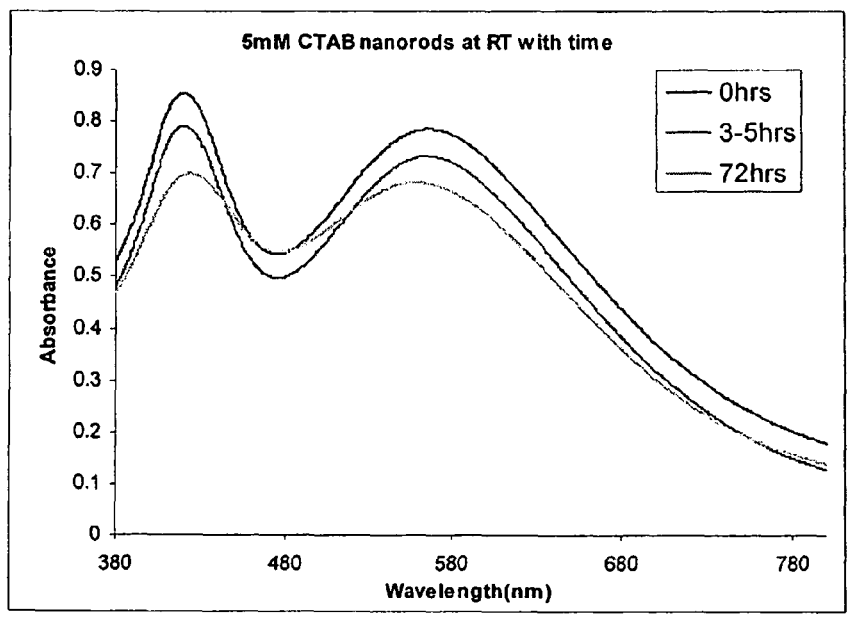
Figure 13:
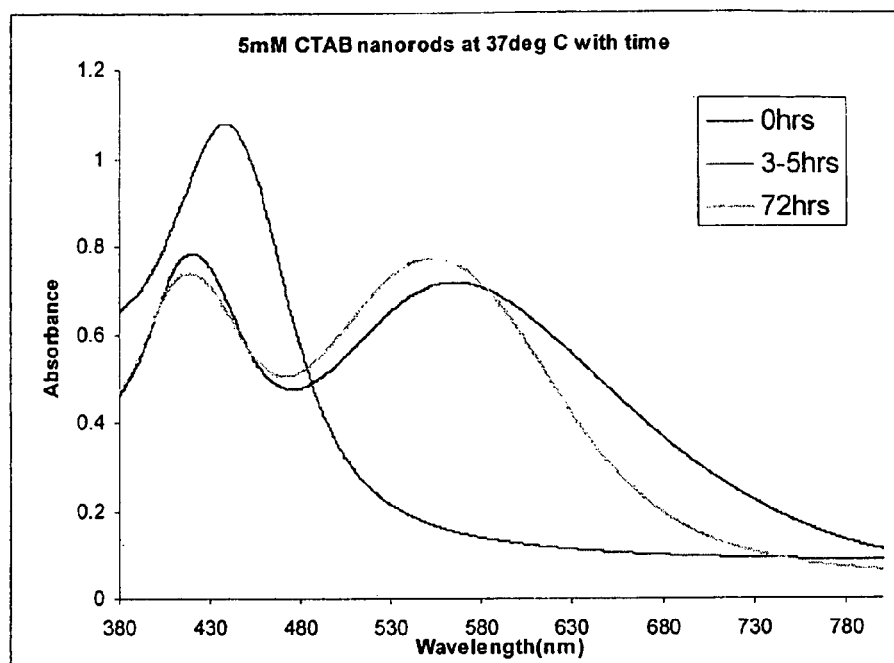

Three samples of 20 mM CTAB were placed in disposable cuvettes for this temperature experiment. One sample was placed in refrigerator at 4° C., one was kept at room temperature and another was kept in a 37° C. water bath. Spectral scans were taken for all the samples, and are shown in FIGS. 5-7. A color change occurred at 37° C.: from green (0 hrs) to blue (3 days) to purple (10 days) to pinkish orange (17 days). No obvious color change occurred at room temperature, and the color change at 4° C. went from green to clear and back to a slight yellowish-green color.

Example V

Temperature Experiment for 1 mM CTAB and 5 mM CTAB, 50 µL Silver Nitrate, 20 µL Seed Based on the previous experiments, the combination of seed, silver nitrate and CTAB was chosen such that the change in wavelength (color or shape of nanoparticles) can be obtained at a rapid rate. Therefore, 1 mM and 5 mM CTAB were chosen with 50 µL silver nitrate and 20 µL seed. Each of the solutions was placed in three disposable cuvettes for temperature controlled experiments. For each solution, one cuvette was placed in the refrigerator at 4° C., one was kept at room temperature, and another was kept at 37° C. in a water bath. Optical absorption spectral measurements were taken for all the samples, and are shown in FIGS. 8-13. For the 1 mM CTAB solution at room temperature, the color changed from green (0 hrs), to pink (3-5 hrs), to yellow (72 hrs). For the 5 mM CTAB solution at room temperature, the color changed very little, becoming only slightly darker. The 5 mM CTAB solution at 4° C. turned a slight brownish color, and the 5 mM CTAB solution at 37° C. turned to yellow (72 hrs).

Example VI

By changing the composition of the system, the color changes can be made to occur over shorter periods of time, thereby providing a more sensitive thermal indicator. The following solutions were made: 1) 20 mM CTAB with 10 µL silver nitrate and 20 µL seed, which remained green in color over a period of 72 hours at room temperature; and 2) 1 mM CTAB with 50 µL silver nitrate and 20 µL seed, which changed color from initial green to pink (at about 3-5 hours), and ultimately yellow over a period of 72 hours at room temperature. The higher CTAB concentration provided more stability and the color did not change within 3 days. At the lower concentration of CTAB, the color changes readily within a few hours. Therefore, the present invention provides thermal indicator applications for different conditions. For some products, short exposures to high temperatures may be inconsequential to their quality. In this case, the thermal indicators can be tailored to change slowly over long periods of time. On the other hand, for products that are extremely sensitive to temperature increases, a thermal indicator that changes color in a much shorter period of time is more appropriate. Therefore, the present invention allows flexibility in the creation of more or less sensitive thermal indicators for a wide range of applications. As evident from solution 2, the color indicator is useful not only to determine if the product was not properly stored but also helps to assess the extent of time during which it was not stored at the required conditions (pink after a couple of hours, yellow after 3 days).

Thus, the invention provides a composition and method for indicating the thermal and/or chronological history of a product by displaying a change in color as an effect of temperature over a period of time, or the period of time itself. The indicator of this invention can help determine if the improper storage conditions were enough to compromise quality or not. The indicator is easy to see as it is based on color, its production is relatively inexpensive, and the conditions under which it displays thermal history effects can be adjusted to varying degrees of sensitivity.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A combination, comprising:
   a plurality of metal nanoparticles that exhibit plasmon resonance in the visible region of the electromagnetic spectrum; and
   a matrix, wherein the plurality of metal nanoparticles is dispersed throughout the matrix to form a thermal or chronological indicator in which the dispersed metal nanoparticles provide a first color and the dispersed metal nanoparticles provide a color change to a second color while remaining dispersed in the matrix, wherein the color change is a function of at least one of time or a change in temperature and the color change is retained by the metal nanoparticles upon a reversal of the change in temperature.

2. The combination of claim 1, wherein the nanoparticles each comprise an anisometric shape.

3. The combination of claim 1, wherein the plurality of nanoparticles comprises at least one of nanorods, nanoplates, nanotriangles, nanoprisms, nanowires, and multipods.

4. The combination of claim 1, wherein the plurality of metal nanoparticles is selected from silver nanoparticles, gold nanoparticles, platinum nanoparticles, copper nanoparticles, and combinations thereof.

5. The combination of claim 1, wherein the matrix comprises a polymer or a polymer film and the plurality of metal nanoparticles are dispersed at least on a surface of the polymer or polymer film.

6. The combination of claim 1, wherein the matrix comprises a solution including a stabilizing surfactant.

7. The combination of claim 6, wherein a rate at which the nanoparticles turn color while dispersed in the matrix is a function of an amount of the stabilizing surfactant.

8. The combination of claim 6, wherein the stabilizing surfactant is selected from the group consisting of cationic, anionic and non-ionic surfactants.

9. The combination of claim 6, wherein the stabilizing surfactant is selected from the group consisting of cetyltrimethyl ammonium bromide, tetraoctyl ammonium bromide, alkanethiols, and combinations thereof.

10. A method of determining at least one of a thermal or chronological history during shipping or storage of a product, the method comprising:
    placing an indicator with the product, the indicator comprising at least one of a thermal history indicator or a chronological indicator, and the indicator including a plurality of metal nanoparticles dispersed throughout a matrix and providing a first color, wherein while placed with the products the dispersed metal nanoparticles turn from the first color to and retain a second color while dispersed in the matrix as a function of at least one of time or a change in temperature;
    at least one of storing or shipping the product with the indicator; and
    evaluating the retained second color of the indicator after the at least one of storing or shipping the product with the indicator.

11. The method of claim 10, wherein the nanoparticles each comprise an anisometric shape.

12. The method of claim 10, wherein the plurality of nanoparticles comprises at least one of nanorods, nanoplates, nanotriangles, nanoprisms, nanowires, and multipods.

13. The method of claim 10, wherein the plurality of metal nanoparticles is selected from silver nanoparticles, gold nanoparticles, platinum nanoparticles, copper nanoparticles, and combinations thereof.

14. The method of claim 10, wherein the matrix comprises a polymer.

15. The combination of claim 1, wherein the matrix comprises a stabilizing material for affecting the second color of the color change or a rate of the color change.

16. The method of claim 10, wherein the matrix comprises a solution.

17. The method of claim 16, wherein the solution comprises a stabilizing surfactant, wherein a rate at which the nanoparticles turn color while dispersed in the matrix is a function of an amount of the stabilizing surfactant.

18. The method of claim 17, wherein the stabilizing surfactant is selected from the group consisting of cationic surfactants, anionic surfactants, non-ionic surfactants, cetyltrimethyl ammonium bromide, tetraoctyl ammonium bromide, alkanethiols, and combinations thereof.

19. A combination, comprising:
    a plurality of metal nanoparticles that exhibit plasmon resonance in the visible region of the electromagnetic spectrum to provide a first color; and
    a matrix, wherein the plurality of metal nanoparticles is dispersed throughout the matrix to form a thermal or chronological indicator for placement with a product during at least one of storage or shipment of the product, the dispersed plurality of metal nanoparticles providing the first color in the matrix and while remaining dispersed in the matrix the dispersed metal nanoparticles providing a color change to a second color as a result of at least one of a change in time or a change in temperature during the storage or shipment, wherein the color change is retained by the metal nanoparticles upon a reversal of the change in temperature.

20. The combination of claim 19, wherein the matrix comprises a stabilizing material for affecting the second color of the color change or a rate of the color change during the storage or shipment.

21. The combination of claim 19, wherein the plurality of metal nanoparticles comprises at least one of nanorods, nanoplates, nanotriangles, nanoprisms, nanowires, and multipods.

* * * * *